United States Patent
Sugimoto

[11] Patent Number: 5,850,761
[45] Date of Patent: Dec. 22, 1998

[54] BRAKE OPERATING DEVICE FOR HANDLE BAR AND BAR ENDS

[75] Inventor: Masanori Sugimoto, Osakasayama, Japan

[73] Assignee: Shimano Inc., Osaka, Japan

[21] Appl. No.: 768,897

[22] Filed: Dec. 17, 1996

[51] Int. Cl.⁶ .................................................. G05G 11/00
[52] U.S. Cl. ...................... 74/489; 74/480 R; 74/479.01; 74/502.2
[58] Field of Search ................................ 74/489, 480 R, 74/479.01, 502.2

[56] References Cited

U.S. PATENT DOCUMENTS

| | | | |
|---|---|---|---|
| 3,915,028 | 10/1975 | Kine | 74/480 R |
| 4,084,449 | 4/1978 | Kine | 74/480 R |
| 4,245,522 | 1/1981 | Robinson | 74/480 R |
| 4,304,145 | 12/1981 | Shimano | 74/480 R |
| 4,543,847 | 10/1985 | Nagano | 74/480 R |
| 5,211,074 | 5/1993 | Yoshigai | 74/551.8 |
| 5,299,466 | 4/1994 | Heilbron et al. | 74/502.2 |
| 5,392,669 | 2/1995 | Li | 74/502.2 |
| 5,493,933 | 2/1996 | Kelly | 74/489 |
| 5,537,891 | 7/1996 | Nagano et al. | 74/525 |
| 5,678,455 | 10/1997 | Watarai | 74/475 |

FOREIGN PATENT DOCUMENTS

| | | |
|---|---|---|
| 719701 | 7/1996 | European Pat. Off. . |
| 856265 | 6/1940 | France . |
| 52-21665 | 2/1977 | Japan . |
| 54-64339 | 5/1979 | Japan . |
| 8183491 | 7/1996 | Japan . |
| 8183492 | 7/1996 | Japan . |

*Primary Examiner*—Richard M. Lorence
*Assistant Examiner*—David Fenstermacher
*Attorney, Agent, or Firm*—Shinjyu Global IP Counselors, LLP

[57] ABSTRACT

An attachment assembly for a bicycle handle bar provides an extension bar as well as a brake operating device therefor. The extension bar, together with the handle bar, provides a pair of gripping portions, while the brake operating device provides a pair of hand portions for operating a brake. The brake operating device is coupled to the free end of the extension bar and provides a pair of hand portions such that the rider can grasp the first hand portion from the extension bar and the second hand portion from the grip portion formed on the primary handle bar. In a first embodiment, the brake operating device is integrally formed as a one-piece, unitary member with a part of the extension bar, while in another embodiment, the brake operating device is formed as a separate unit which is releasably coupled to the extension bar. In one embodiment, each of the first and second hand portions extends outwardly from a connecting portion to a free end, while in another embodiment, the second hand portion extends from one end of the first hand portion.

45 Claims, 7 Drawing Sheets

BRAKE OPERATING DEVICE FOR HANDLE BAR AND BAR ENDS

FIELD OF THE INVENTION

The present invention generally relates to a brake operating device with a pair of hand portions for operating brakes from two distinct gripping positions on the handle bar. More specifically, the present invention relates to a brake operating device mounted on an extension bar or bar end of a handle bar having two distinct gripping positions, i.e., one gripping position on the extension bar or bar end and a second gripping position on the handle bar.

BACKGROUND OF THE INVENTION

Bicycling is becoming an increasingly more popular form of recreation as well as a means of transportation. There are three main types of bicycles which are currently on the market, namely, a road racing bike, a mountain bike and a hybrid bike. The road racing bikes typically have a drop-type handle bar with a generally straight center section and a pair of forwardly and downwardly extending curved sections mounted on each end of the center sections. The mountain bikes and the hybrid bikes typically have a generally straight horizontal handle bar with a pair of optional extension members or bar ends attached to each end of the straight handle bar. These bar ends or extension members are typically positioned to extend upwardly from the straight handle bar section and curve inwardly towards the center of the bike.

Bicycle brakes are typically operated by brake operating devices mounted on the handle bar of the bicycle. Typically, a bicycle is provided with front and rear brakes such that a pair of brake operating devices are attached to the handle bar. Since many handle bars have two distinct and separate gripping positions for the rider, it is desirable for the rider to quickly and conveniently operate the brake operating devices in both positions. In other words, it is desirable for the rider to be able to operate the brake without having to change his or her grip on the handle bar. Accordingly, it is desirable to have brake operating devices which are capable of being operated in either of the two distinct gripping or riding positions.

In the case of road racing bikes, there have been developed many types of brake operating devices which can be operated in the two distinct gripping or riding positions. Examples of these types of brake operating devices are disclosed in U.S. Pat. No. 3,915,028 to Kine; U.S. Pat. No. 4,084,449 to Kine; U.S. Pat. No. 4,304,145 to Shimano; and U.S. Pat. No. 4,543,847 to Nagano. Each of these brake operating devices are designed to be used with a road racing type bike having drop-type handle bars. However, they are not suitable for mountain bikes or all terrain bikes which have generally straight, horizontal handle bars with an extension bar or bar end. Accordingly, there is a need for a brake operating device which can be utilized on a generally straight handle bar with a pair of bar ends or extensions attached thereto.

One example of a brake operating device which has been developed for use with a mountain bike type handle bar with extension bars or bar ends is disclosed in U.S. Pat. No. 5,299,466 to Heilbron et al. While the brake operating device of this patent enables the rider to operate the brake without having to remove his or her hands from the extension bar, it does not provide the rider with substantially the same feel in operating the brake from the extension bar or bar end as compared to the straight section of the main handle bar.

In view of the above, there exists a need for an apparatus to permit a rider to quickly and conveniently operate the brakes of a bicycle in such a manner that a rider's hands can grasp the brake operating device from either of the two gripping positions of the handle bars. This invention addresses this need in the art as well as other needs in the art which will become apparent to those skilled in the art from this disclosure.

SUMMARY OF THE INVENTION

A primary object of the present invention is to provide a brake operating device which permits the rider to operate the brakes from two distinct positions without having to release a grip from the handle bars in either of the two gripping or riding positions.

Another object of the present invention is to provide a brake operating device which provides the rider with substantially the same feel when operating the brakes from either of the two gripping or riding positions.

Still another object of the present invention is to provide a brake operating device which mounts on the free end of an extension bar or bar end.

The foregoing objects of the present invention can basically be attained by providing a brake operating device for use with a handle bar having a first grip portion extending in a first direction and a second grip portion extending in a second direction which forms an angle with the first direction, comprising a lever bracket for attachment to the handle bar and to a portion of a control wire; and a brake lever pivotally coupled to the lever bracket between a release position and a brake position, the brake lever including a retaining portion forming a connection point for coupling one end of the control wire thereto, a first hand portion swingably mounted about a pivot axis and positioned adjacent the first grip portion of the handle bar to permit the rider's hand to grasp the first hand portion from the first grip portion of the handle bar, and a second hand portion swingably mounted about a pivot axis and positioned adjacent the second grip portion of the handle bar to permit the rider's hand to grasp the second hand portion from the second grip portion of the handle bar, the first and second hand portions being spaced approximately 45° or less apart from each other as measured about their respective pivot axes in the release position of the brake lever.

Additionally, the objects of the present invention can basically be obtained by an attachment assembly for attachment to one end of a handle bar, comprising: an extension bar having a first end with a clamp for coupling to the one end of the handle bar, a middle grip portion for a rider's hand, and a second end positioned remotely from the handle bar; and a brake operating device coupled to the extension bar substantially adjacent the second end, the brake operating device includes a retaining portion forming a connection point for coupling one end of a control wire thereto, a first hand portion swingably mounted about a pivot point from a release position to a brake position and positioned adjacent the middle grip portion of the extension bar to permit the rider's hand to grasp the first hand portion from the middle grip portion of the extension bar, and a second hand portion swingably mounted about a pivot point from a release position to a brake position and positioned adjacent the handle bar coupled to the first end of the extension bar to permit the rider's hand to grasp the second hand portion from the handle bar.

The foregoing objects can also be attained by providing a handle bar assembly for attachment to a vehicle, comprising:

a cross bar having a center portion, a first end with a first grip portion located on one side of the center portion, and a second end with a second grip portion located on the other side of the center portion; a first bar end having a first end coupled to the first end of the cross bar so as to extend generally perpendicular to the cross bar, a middle grip portion for receiving a rider's hand, and a second end positioned remotely from the cross bar; and a first brake operating device fixedly coupled to the first bar end, the first brake operating device including a first retaining portion forming a first connection point for coupling one end of a first control wire thereto, a first hand portion swingably mounted about a pivot point from a release position to a brake position and positioned adjacent the middle grip portion of the first bar end to permit the rider's hand to grasp the first hand portion from the middle grip portion of the first bar end, and a second hand portion swingably mounted about a pivot point from a release position to a brake position and positioned adjacent the first grip portion of the cross bar to permit the rider's hand to grasp the second hand portion from the first grip portion of the cross bar.

Furthermore, the above objects can be attained by providing a brake operating device for use with a handle bar having a first grip portion and a second grip portion, comprising: a lever bracket for attachment to the handle bar and to a portion of a control wire, the lever bracket having a pivot point with a pivot axis arranged substantially transverse to a longitudinal plane of the lever bracket; and a brake lever pivotally coupled to the lever bracket about the pivot point between a release position and a brake position, the brake lever including a retaining portion forming a connection point for coupling one end of the control wire thereto, a first hand portion swingably mounted about the pivot point and lying on one side of the longitudinal plane of the lever bracket such that the first hand portion is located adjacent the first grip portion of the handle bar to permit the rider's hand to grasp the first hand portion from the first grip portion of the handle bar, and a second hand portion swingably mounted about the pivot point and lying on an opposed side of the longitudinal plane from the first hand portion such that the second hand portion is positioned adjacent the second grip portion of the handle bar to permit the rider's hand to grasp the second hand portion from the second grip portion of the handle bar.

In one embodiment of the present invention, the extension bar or bar end and the brake operating device are formed as an integral unit which is attached to the straight section of the main handle bar.

According to a further embodiment of the present invention, the brake operating device can have a pair of separate and distinct hand portions or levers which can either pivot together or pivot independently of each other.

Still in another embodiment of the present invention, the first and second hand portions of the brake lever could be formed as one single lever with the second lever coupled to the end of the first lever.

Yet in another embodiment of the present invention, the brake operating device can be a separate unit which can be clamped to a bar end or a portion of a handle bar.

Other objects, advantages and salient features of the present invention will become apparent to those skilled in the art from the following detailed description, which, taken in conjunction with the annexed drawings discloses four preferred embodiments of the present invention.

BRIEF DESCRIPTION OF THE DRAWINGS

Referring now to the attached drawings which form part of this original disclosure.

DETAILED DESCRIPTION OF THE PREFERRED EMBODIMENTS

Figure 1:
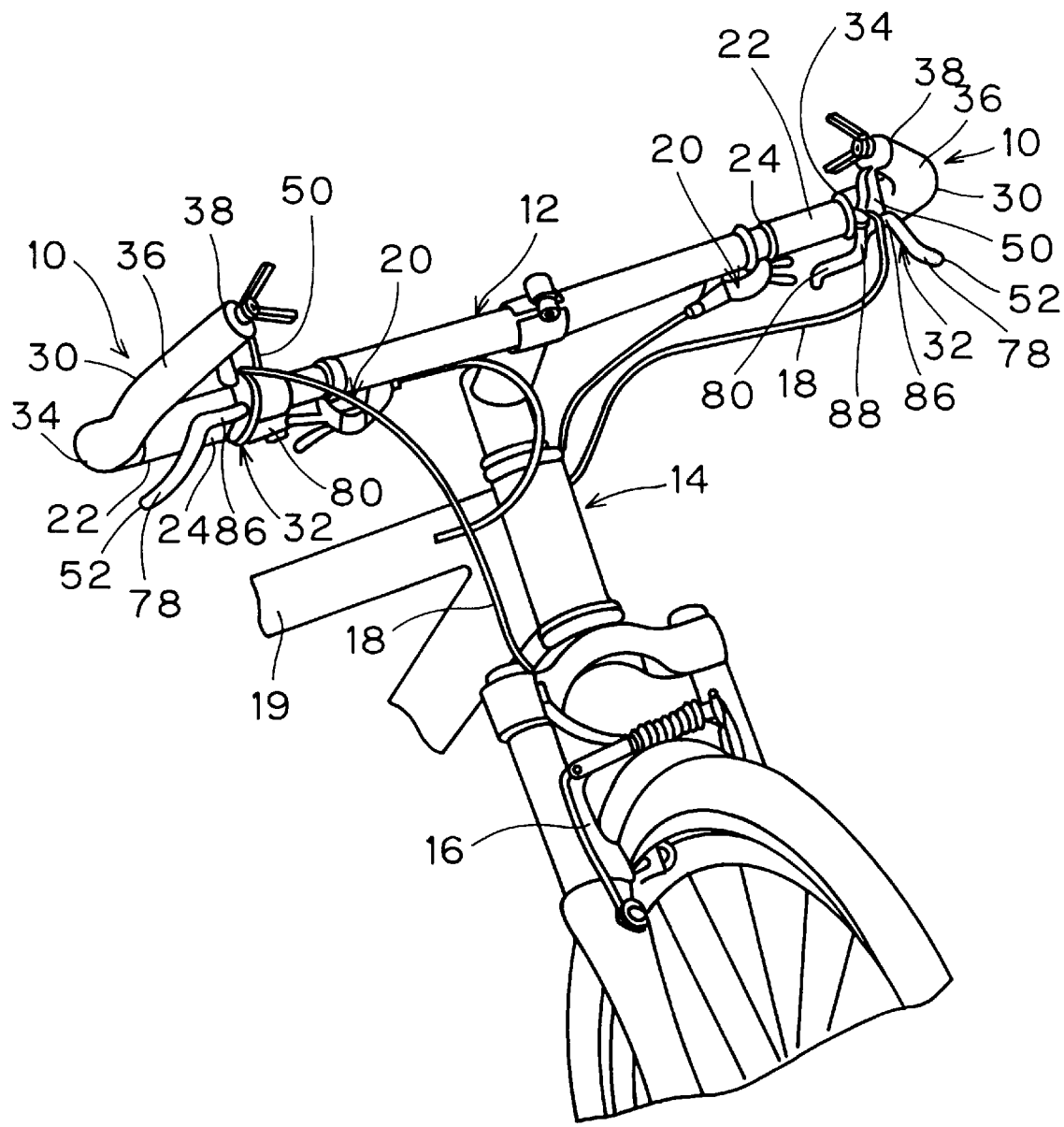
FIG. 1 is a partial perspective view of a front portion of a bicycle illustrating a generally straight handle bar, a front brake, a pair of shifting mechanisms and a pair of attachment assemblies with a pair of brake operating devices in accordance with the present invention.

Referring initially to FIG. 1, a pair of attachment assemblies 10 in accordance with a first embodiment the present invention is illustrated as being coupled to a handle bar 12 of bicycle 14 for operating its front and rear brakes 16 (only front brake shown) via a pair of control wires 18. Bicycle 14 and brakes 16 are well known in the art, and thus, will not be discussed or illustrated in detail herein. While bicycle 14 is preferably either a mountain bike or a hybrid bike, it will be apparent to those skilled in the art that attachment assemblies 10 do not depend upon the type of bicycle, but rather depend upon the shape of handle bar 12. In fact, attachment assemblies 10 can be utilized on motorized vehicles having handle bars such as motorcycles, all terrain vehicles and the like.

Basically, in mountain bikes, handle bar 12 is a generally straight, horizontal member attached to the bicycle frame 19. In particular, handle bar 12 is attached at its center portion to frame 19. The ends of handle bar 12 has a pair of primary grip portions 22 formed thereon. Preferably, grip portions 22 have resilient tubular hand grips 24 positioned along grip portions 22 of handle bar 12. Handle bar 12 and hand grips 24 are well known in the art, and thus will not be discussed or illustrated in detail herein.

A pair of shifting mechanisms 20 can be coupled to handle bar 12 for shifting the gears of bicycle 14 in a conventional manner. Each of the shifting mechanisms 20 has a pair of primary shifting levers 20a and 20b and a pair of secondary shifting levers 20c and 20d. Primary shifting levers 20a and 20b are coupled to shifting body 21 which in turn is fixedly coupled to handle bar 12. The operation of shifting mechanism 20 by primary shifting levers 20a and 20b is well known in the art, and thus, the operation of shifting mechanism 20 via primary shifting levers 20a and 20b will not be discussed or illustrated in detail herein. One of the primary shifting levers 20a and 20b shifts the front or back derailleur up, while the other one of the primary shifting levers shifts the front or rear derailleur down.

Secondary shifting levers 20c and 20d are coupled to free end 38 of extension bar 30. Secondary shifting levers 20c and 20d are designed to remotely operate primary shifting levers 20a and 20b, respectively. In other words, one of the secondary levers 20c and 20d shifts the front or rear derailleur up, while the other one shifts the front or rear derailleur down. Shifting cable 23 interconnects shifting levers 20a and 20c together, while shifting cable 25 interconnects shifting levers 20b and 20d together. Alternatively, cables 23 and 25 can be connected directly to the mechanism of main shifting body 21. It will be apparent to those skilled in the art that the rider can control the main shifting body 21 by engaging the primary or secondary shifting levers 20a–20d. When one of the secondary shifting levers 20c and 20d are depressed by the rider, this will cause tension in one of the shifting cables 23 and 25 which in turn adjust the mechanism within main shifting body 21 for shifting up or down in gears of bicycle 14. The mechanism of main shifting body 21 is well known in the art as well as its operation of either the front or rear derailleur. Therefore, its operation will not be discussed or illustrated herein.

Figure 4:
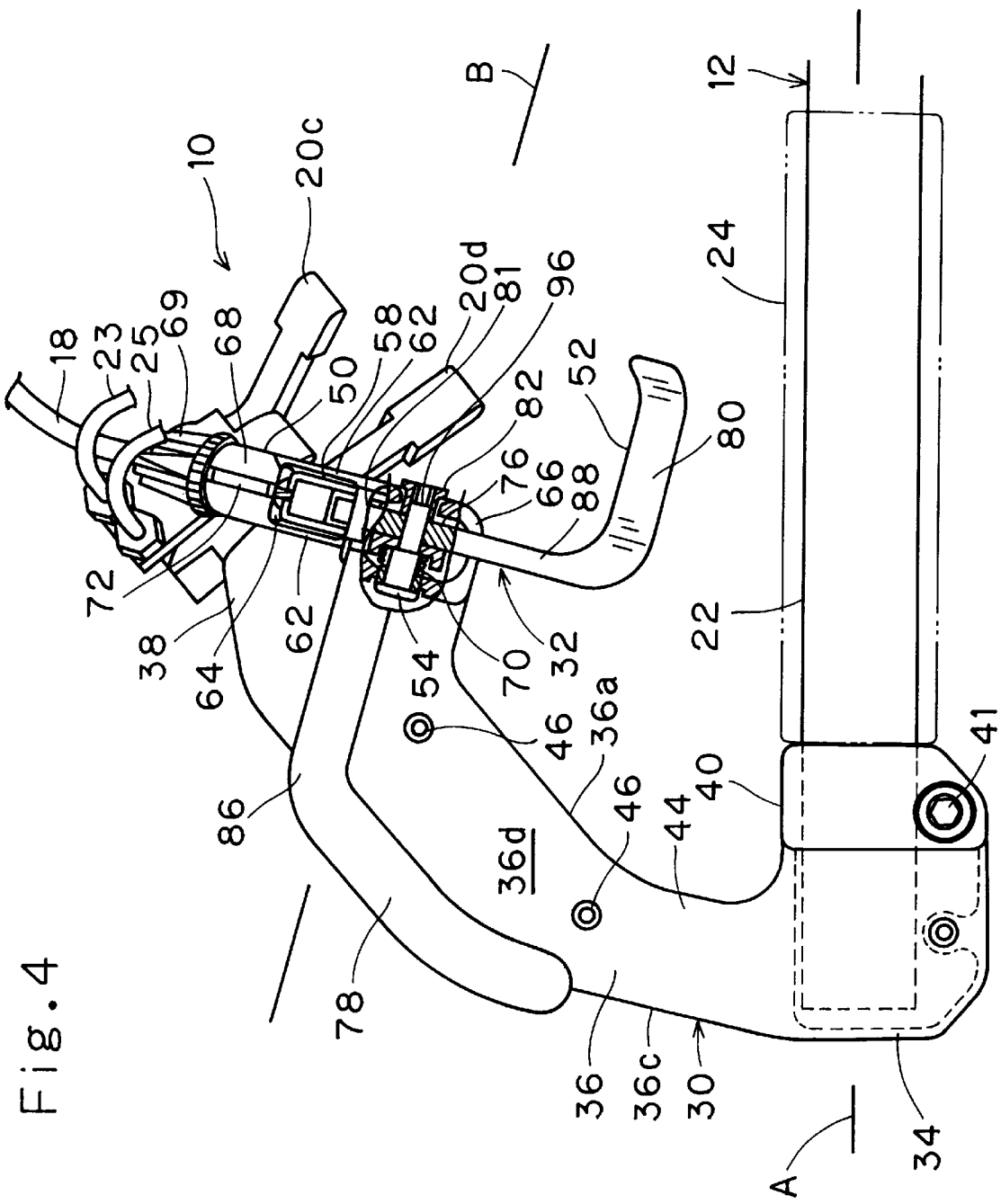
FIG. 4 is a bottom plan view of the right attachment assembly and its associated brake operating device illustrated in FIGS. 1–3 with certain portions broken away for purposes of illustration.

While handle bar 12 is illustrated as being generally straight, it will be apparent to those skilled in the art that handle bar 12 can be bent to a variety of conventional configurations as needed and/or desired. As seen in FIG. 4, each of the grip portions 22 of handle bar 12 has a center longitudinal axis A, which in this embodiment are coaxial, but which in handle bars of other different shapes can be non coaxial.

Figure 2:
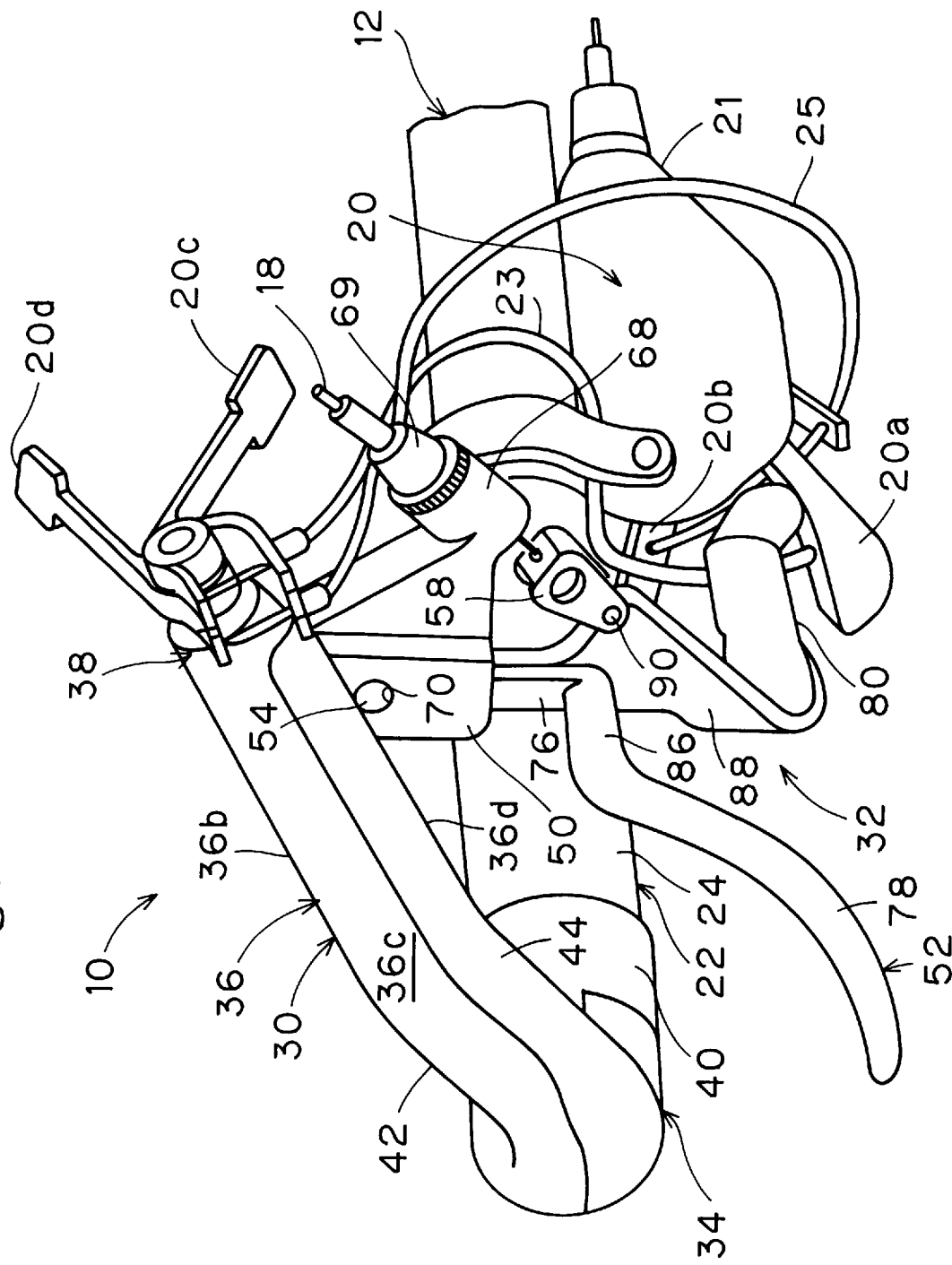
FIG. 2 is an enlarged perspective view of the right attachment assembly and its associated brake operating device in accordance with the present invention.

Attachment assemblies 10 are substantially identical to each other but are mirror images of each other such that they can be releasably attached to the free ends of handle bar 12 adjacent grip portions 22. Since the left and right attachment assemblies 10 are substantially identical, like reference numerals will be utilized to indicate similar parts in discussing and illustrating the present invention herein. Moreover, only the right attachment assembly will be illustrated in FIGS. 2–4.

Each of the attachment assemblies 10 includes an extension bar or bar end 30 with a brake operating device 32 coupled thereto. Extension bar 30 is typically known as a bar end within the bicycle art. A typical bar end is illustrated in U.S. Pat. No. 5,299,466 to Heilbron et al., the disclosure of which is hereby incorporated herein by reference. More specifically, one end of each extension bar 30 is coupled to one of the free ends of handle bar 12 adjacent one of the grip portions 22, while the brake operating device 32 is coupled to the other end of extension bar 30. Extension bar 30 forms a secondary grip portion which preferably extends upwardly and outwardly from handle bar 12 and bends slightly inwardly towards the center plane of bicycle 12.

Accordingly, handle bar 12 in conjunction with extension bar 30 provides the rider with a pair of distinct and separate gripping or riding positions. The rider typically uses the grip portions 22 of the handle bar 12 so that he or she can lean forward into a position from which he or she can apply greater force to the pedals of the bicycle 14 The rider uses the extension bars 30 for a more upright and relaxed ride. The brake operating device 32 is arranged such that the rider can operate the associated brake 16 in either of the two gripping or riding positions.

Extension bar 30 has a first clamping end 34, a middle grip portion 36 and a second free end 38. First clamping end 34 has a tubular clamp 40 which receives one end of handle bar 12 adjacent one of its grip portions 22. In particular, tubular clamp 40 is a split tube with a screw 41 for tightening clamp 40 about the end of handle bar 12. Accordingly, extension bar 30 is adjustable relative to handle bar 12 for changing the relative angular position therebetween. Preferably, clamp 40 is integrally formed at one end of middle grip portion 36.

Middle grip portion 36 is preferably a curved member which integrally formed with clamp 40 and a part of brake operating device 32. Preferably, middle grip portion 36 is contoured to comfortably fit a rider's hand. When extension bar 30 is attached to handle bar 12, middle grip portion 36 will typically extend upwardly and outwardly from handle bar 12 and curve slightly inwardly towards the center plane of bicycle 14. Middle grip portion 36 can be constructed of a single material or can be a composite member constructed of one or more parts, preferably two halves as seen in FIGS. 2–5. For example, middle grip portion 36 can have an upper portion 42 formed out of a hard, rigid metallic material and a lower portion 44 constructed of another material such as a hard rigid plastic material. The upper and lower portions 42 and 44 can be coupled together by a pair of fasteners 46.

Brake operating device 32 is preferably coupled to upper portion 42 of middle grip portion 36 adjacent second free end 38 of extension bar 30 along its inner gripping surface 36a. Accordingly, the upper gripping surface 36b, the outer gripping surface 36c and the lower gripping surface 36d of the middle grip portion 36 adjacent brake operating device 32 is substantially unobstructed by brake operating device 32. This allows the rider to grip the inner, upper, outer and lower gripping surfaces 36a–36d of middle grip portion 36 as necessary. In other words, brake operating device 32 is offset inwardly from middle grip portion 36 such that the rider can grip middle grip portion 36 of extension bar 30 adjacent brake operating device 32.

Brake operating device 32 basically includes a lever bracket 50 coupled to extension bar 30, a brake lever 52 pivotally coupled to lever bracket 50 by a pivot pin 54 about a pivot axis B, a spring 56 coupled between lever bracket 50 and brake lever 52, and a retaining portion or member 58 coupled to brake lever 52 for coupling one of the control wires 18 thereto.

As mentioned above, brake operating device 32 is designed to operate one of the brakes 16 of bicycle 14 when the rider's hand is either on grip portion 22 of handle bar 12 or grip portion 36 of extension bar 30. Moreover, brake operating device 32 is designed to provide the rider with substantially the same feel in applying the brakes regardless of which of the two gripping positions the rider's hands are in. In other words, brake operating device 32 is designed so that substantially the same grip dimension is provided between brake lever 52 and each of the grip portions 22 and 36. Moreover, the lever arms created by brake lever 52 and retaining member 58 relative to pivot pin 54 are preferably substantially identical to the rider whether the rider grips the brake lever 52 from either grip portion 22 or grip portion 36.

Lever bracket 50 in the first embodiment is preferably inseparably formed with the upper half of middle grip portion 36 of extension bar 30. In other words, lever bracket 50 is a one-piece, unitary part of upper portion 42 of middle grip portion 36, i.e., not separable from middle grip portion 36. Of course, lever bracket 50 can be integrally coupled to middle grip portion 36 such that it performs as an integrated member or portion of extension bar 30. In other words, as used herein, the term "integral" refers to a part that can be fixedly coupled to another part, while the phrase "one-piece, unitary" refers to an element which is not constructed of several separable pieces. In any event, lever bracket 50 is preferably offset from middle grip portion 36, as mentioned above, so that the rider can grip middle grip portion 36 adjacent lever bracket 50, as needed or desired.

Figure 3:
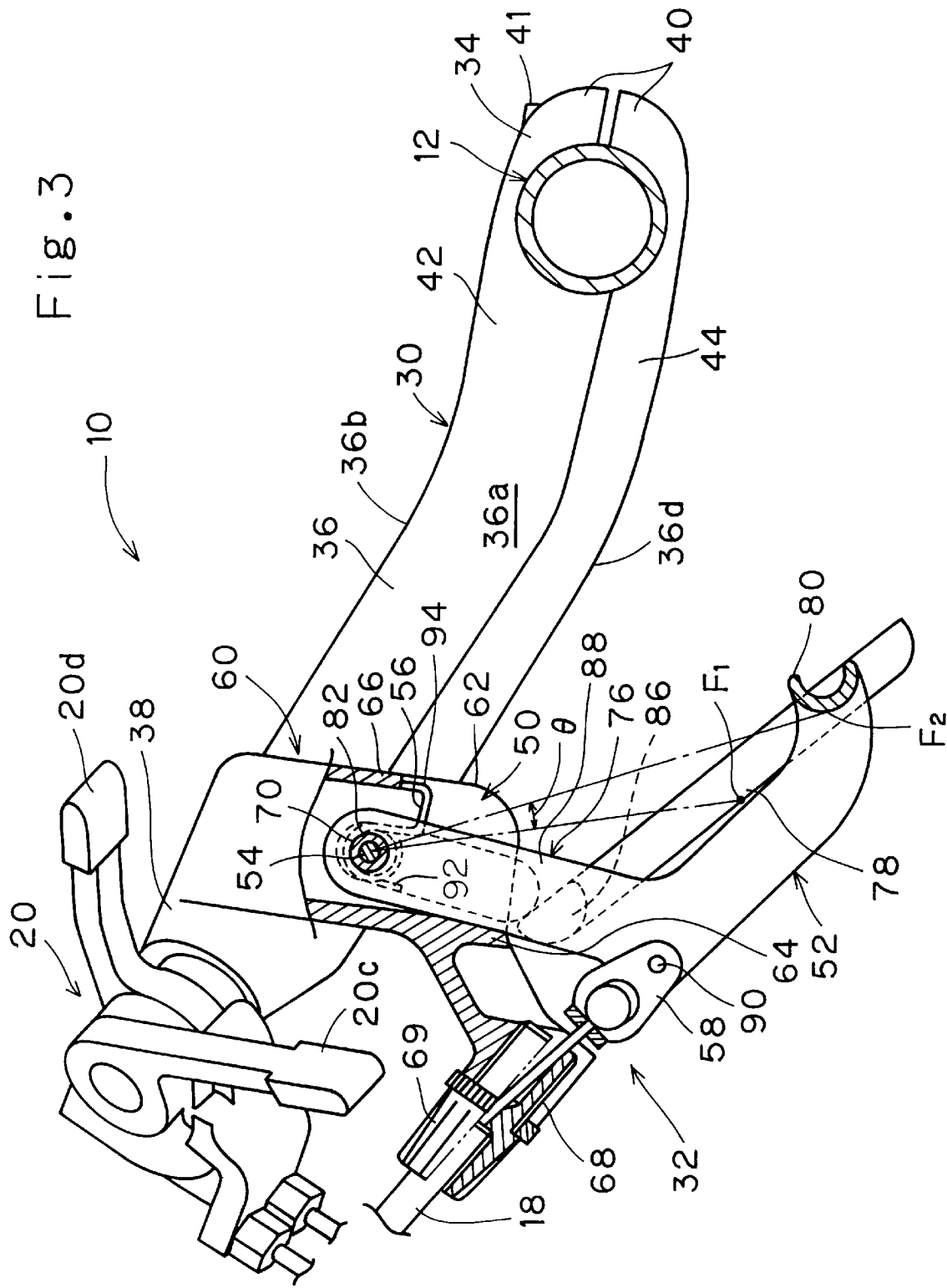
FIG. 3 is an inner side elevational view of the right attachment assembly and its associated brake operating device illustrated in FIGS. 1 and 2 as viewed along the pivot axis of the brake operating device and with certain portions of the lever bracket broken away for purposes of illustration.

Referring now to FIGS. 3 and 4, lever bracket 50 preferably includes a connecting portion 60, a pair of side walls 62 extending downwardly from connecting portion 60, a front wall 64 extending between side walls 62, and a rear stop wall 66 extending between side walls 62. Also, a control wire support 68 is formed at the front lower end of front wall 64 for receiving and securing a portion of one of the control wires 18 thereto in a conventional manner.

As best seen in FIG. 4, side walls 62 are spaced apart from each other so as to form a cavity for receiving a portion of brake lever 52 therebetween. Also, a pivot hole 70 is formed in each of the side walls 62 for receiving pivot pin 54 therein to pivotally couple brake lever 52 thereto.

Referring again to FIG. 3, front wall 64 is designed to limit the forward pivotal movement of brake lever 52 which is biased forwardly by spring 56 to a release position. In particular, when brake lever 52 abuts against front wall 64, brake lever 52 is in its release position. In other words, when brake lever 52 is in its release position, the control wire 18 attached to brake lever 52 is let out to open the associated brake 16.

Control wire support 68 is preferably a tubular member having internal threads for threadedly receiving a wire adjustment nut 69. Also, control support 68 preferably has a slot 72 for inserting one of the control wires 18 therethrough during attachment of control wire 18 to brake operating device 32. Control wire support 68 is a relatively conventional type structure, and thus, will not be discussed or illustrated in further detail.

Brake lever 52 includes a connecting portion 76, a first hand portion 78 outwardly from connecting portion 76 in a first direction and a second hand portion 80 extending outwardly from connecting portion 76 in a second direction. Portions 76, 78 and 80 can all be constructed as a one-piece, unitary member or could be constructed of several pieces as shown in the drawings. For example, brake lever 52 can be constructed of two pieces with a first piece including first hand portion 78 and first half of connecting portion 76, and a second piece including second hand portion 80 and a second half of connecting portion 76. Preferably, the first and second halves of connecting portion 76 are fixedly coupled together by a fastener or rivet 81 such that first and second hand portions 78 and 80 pivot together. Of course, it will be apparent to those skilled in the art from this disclosure that connecting portion 76 can be constructed such that first hand portion 78 can move independently of second hand portion 80, or vice-a-versa.

Connecting portion 76 has a pivot hole 82 for receiving pivot pin 54 therethrough for pivotally coupling brake lever 52 thereto. In other words, first and second hand portions 78 and 80 are swingable about the pivot axis or point of pivot pin 54 from a release position to a brake position. Connecting portion 76 also has a recess for receiving a portion of spring 56 to bias brake lever 52 to its release position. First hand portion 78 lies on one side of a center plane of lever bracket 50, while second hand portion 80 lies on an the opposite side of the center plane of lever bracket 50.

First hand portion 78 is positioned generally parallel and adjacent middle grip portion 36 of extension bar 30 to permit the rider's hand to grasp first hand portion 78 from the middle grip portion 36 of extension bar 30. First hand portion 78 has its first end coupled to the lower end of connecting portion 76 via an intermediate or arm portion 86. Intermediate portion 86 extends substantially perpendicularly between connecting portion 76 and hand portion 78. The second end of second hand portion 78 is preferably a free end. First hand portion 78 is also preferably shaped such that it does not extend outwardly relative to extension bar 30. In other words, if the bicycle 14 should fall and the extension bar 30 should hit the ground, first hand portion 78 should be positioned inwardly from the outer gripping surface 36c of middle grip portion 36.

Second hand portion 80 is preferably positioned generally parallel and adjacent the grip portion 22 of handle bar 12 to permit the rider's hand to grasp second hand portion 80 from grip portion 22 of handle bar 12. Second hand portion 80 has a first end coupled to connecting portion 76 via an intermediate or arm portion 88 and a second free end. Intermediate portion 88 extends outwardly from connecting portion 76 such that hand portion 80 is spaced to one side of connecting portion 76.

Preferably, second hand portion 80 is designed such that it receives a single finger of the rider's hand. Of course, second hand portion 80 can be designed such that the rider can grasp second hand portion 80 with more than one finger, i.e., second hand portion 80 can be made longer as needed and/or desired. Also, while second hand portion 80 is generally parallel to grip portion 22 of handle bar 12, it will be apparent to those skilled in the art that second hand portion 80 forms an acute angle with grip portion 22 of handle bar 12.

Intermediate portion 88 preferably includes a hole for mounting retaining portion or member 58 thereto via pin 90. Of course, it will be apparent to those skilled in the art that intermediate portion 86 could have a hole shaped and sized for receiving one end of control wire 18 directly therein without the need of retaining member 58. Retaining member 58 is preferably a conventional U-shaped metal bracket which is well-known in the art, and thus, will not be discussed in detail herein.

Spring 56 is preferably a torsion spring which is positioned about pivot pin 54 and located within a recess of connecting portion 76 of brake lever 52 such that a first end 92 of spring 56 engages brake lever 52 and a second end 94 of spring 56 engages a portion of lever bracket 50. Thus, spring 56 normally biases brake lever 52 relative to lever bracket 50 and extension bar 30 to a release position where connecting portion 76 engages front wall 64.

In order to give the rider substantially the same feel whether applying a force to first hand portion 78 or a force to second hand portion 80, the first and second hand portions 78 and 80 in their release positions have their points of force or force application points $F_1$ and $F_2$ spaced no greater than approximately 45° apart from each other as measured about the pivot point or pivot axis of pivot pin 54. The point of force $F_1$ for hand portion 78 is located approximately 1 inch from the effective free end of hand portion 78. The point of force $F_2$ for hand portion 80 includes all of the operative surface of hand portion 80 which is generally parallel to grip portion 22 and within the rider's grasp. In the preferred embodiment, the angle Ø formed between the points of force $F_1$ and $F_2$ is approximately 4° apart as measured about pivot axis B as seen in FIG. 3. The preferred range for angle Ø is 0°–36°. Moreover, the lever arm created between pivot pin 54 and connection point of pin 90 is identical for each of the first and second hand portions 78 and 80. Moreover, the lever arms formed between the pivot point or pivot axis of pivot pin 54 and the points of force $F_1$ and $F_2$ of hand portions 78 and 80 are preferably substantially the same.

Middle grip portion 36 and hand portions 78 and 80 are configured such that the grip dimension between first hand portion 78 and middle grip portion 36 is substantially similar to the grip dimension between second hand portion 80 and grip portion 22 of handle bar 12. Of course, the amount of travel of hand portions 78 and 80 are also substantially identical in view of the above discussed relationship.

Second Embodiment

Figure 5:
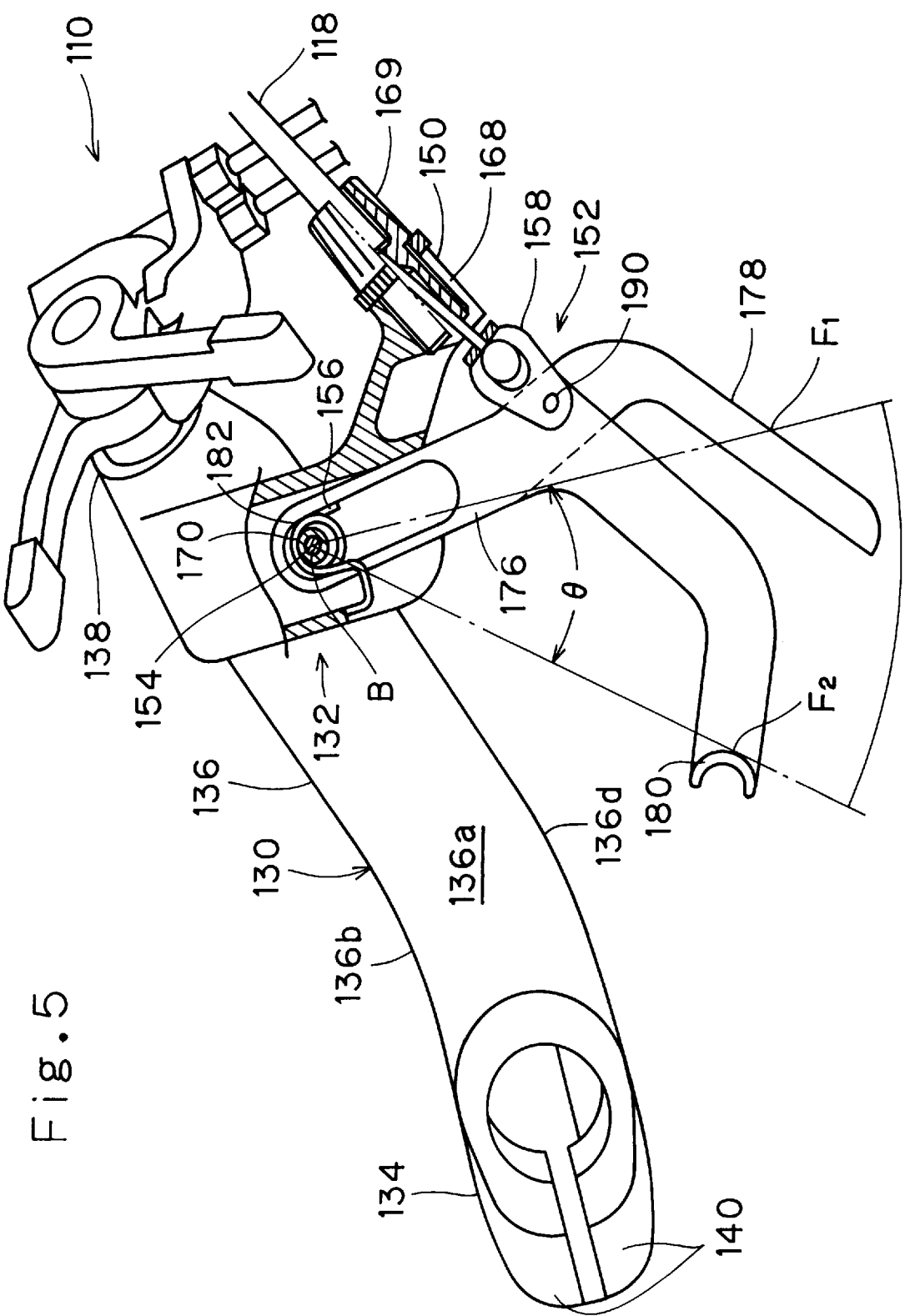
FIG. 5 is an inner side elevational view of a left attachment assembly and its associated brake operating device in accordance with a second embodiment of the present invention as viewed along the pivot axis of its brake operating device and with certain portions broken away for purposes of illustration.

Referring now to FIG. 5, an alternate attachment assembly 110 is illustrated in accordance with a second embodiment of the present invention. In this embodiment, attachment assembly 110 is substantially identical to attachment assembly 10, discussed above, except that brake lever 152 of this embodiment has been modified to provide a larger angle between the points of force $F_1$ and $F_2$ of hand portions 178 and 180. Thus, attachment assembly 110 will not be discussed or illustrated in as much detail as the first embodiment since it will be apparent to those skilled in the art that similar features of the first embodiment apply to this second embodiment.

Basically, attachment assembly 110 includes an extension bar or bar end 130 with a brake operating device 132 coupled thereto. More specifically, extension bar 130 is adapted to be coupled to one of the free ends of handle bar 12 adjacent one of the grip portions 22, while the brake operating device 132 is coupled to the other end of extension bar 130. Extension bar 130 forms a secondary grip portion which preferably extends upwardly and outwardly from handle bar 12 and bends slightly inwardly towards the center plane of the bicycle.

Extension bar 130 has a first clamping end 134, a middle grip portion 136 and a second free end 138. First clamping end 134 has a tubular clamp 140 which receives one end of handle bar 12 adjacent one of its grip portions 22. In particular, tubular clamp 140 is split tube with a screw for tightening clamp 140 about the end of handle bar 12. Accordingly, extension bar 130 is adjustable relative to handle bar 12 for changing the relative angular position therebetween. Preferably, clamp 140 is integrally formed at one end of middle grip portion 136.

Brake operating device 132 is preferably coupled to middle grip portion 136 adjacent second free end 138 of extension bar 130 along its inner gripping surface 136a. This allows the rider to grip the inner, upper, outer and lower gripping surfaces of middle grip portion 136 as necessary. In other words, brake operating device 132 is offset inwardly from middle grip portion 136 such that the rider can grip middle grip portion 136 of extension bar 130 adjacent brake operating device 132.

Brake operating device 132 basically includes a lever bracket 150 coupled to extension bar 130, a brake lever 152 pivotally coupled to lever bracket 150 by a pivot pin 154 about a pivot axis B, a spring 156 coupled between lever bracket 150 and brake lever 152, and a retaining portion or member 158 coupled to brake lever 152 for coupling one of the control wires 118 thereto.

Brake operating device 132 is designed to operate one of the brakes of bicycle when the rider's hand is either on grip portion 22 of handle bar 12 or grip portion 136 of extension bar 130. Moreover, brake operating device 132 is designed to provide the rider with substantially the same feel in applying the brakes regardless of which of the two gripping positions the rider's hands are in. In other words, brake operating device 132 is designed so that substantially the same grip dimension is provided between brake lever 152 and each of the grip portions 122 and 136. Moreover, the lever arms created by brake lever 152 and retaining member 158 relative to pivot pin 154 are preferably substantially identical to the rider whether the rider grips the brake lever 152 from either grip portion 22 or grip portion 136.

Brake lever 152 includes a connecting portion 176, a first hand portion 178 outwardly from connecting portion 176 in a first direction and a second hand portion 180 extending outwardly from connecting portion 176 in a second direction. First hand portion 178 lies on one side of a center plane of lever bracket 150, while second hand portion 180 lies on an the opposite side of the center plane of lever bracket 150.

First hand portion 178 is positioned generally parallel and adjacent middle grip portion 136 of extension bar 130 to permit the rider's hand to grasp first hand portion 178 from the middle grip portion 136 of extension bar 130. First hand portion 178 has its first end coupled to the lower end of connecting portion 176 via an intermediate or arm portion 186. Intermediate portion 186 extends substantially perpendicularly between connecting portion 176 and hand portion 178. The second end of second hand portion 178 is preferably a free end.

Second hand portion 180 is preferably positioned generally parallel and adjacent the grip portion 122 of handle bar 12 to permit the rider's hand to grasp second hand portion 180 from grip portion 22 of handle bar 12. Second hand portion 180 has a first end coupled to connecting portion 176 via an intermediate or arm portion 188 and a second free end. Intermediate portion 188 extends outwardly from connecting portion 176 such that hand portion 180 is spaced to one side of connecting portion 176.

In order to give the rider substantially the same feel whether applying a force to first hand portion 178 or a force to second hand portion 180, the first and second hand portions 178 and 180 in their release positions have their points of force $F_1$ and $F_2$ spaced no greater than approximately 45° apart from each other as measured about the pivot point or pivot axis of pivot pin 154. The point of force $F_1$ for hand portion 178 is located approximately 1 inch from the effective free end of hand portion 178. The point of force $F_2$ for hand portion 180 includes all of the operative surface of hand portion 180 which is generally parallel to grip portion 122 and within the rider's grasp. In this preferred embodiment, the angle Ø formed between the points of force $F_1$ and $F_2$ is approximately 36° apart as measured about pivot axis B. Moreover, the lever arm created between pivot pin 154 and connection point of pin 190 is identical for each of the first and second hand portions 178 and 180. Moreover, the lever arms formed between the pivot point or pivot axis of pivot pin 154 and the points of force $F_1$ and $F_2$ of hand portions 78 and 80 are preferably substantially the same.

Middle grip portion 136 and hand portions 178 and 180 are configured such that the grip dimension between first hand portion 178 and middle grip portion 136 is substantially similar to the grip dimension between second hand portion 180 and grip portion 22 of handle bar 12. Of course, the amount of travel of hand portions 178 and 80 are also substantially identical in view of the above discussed relationship.

Third Embodiment

Figure 6:
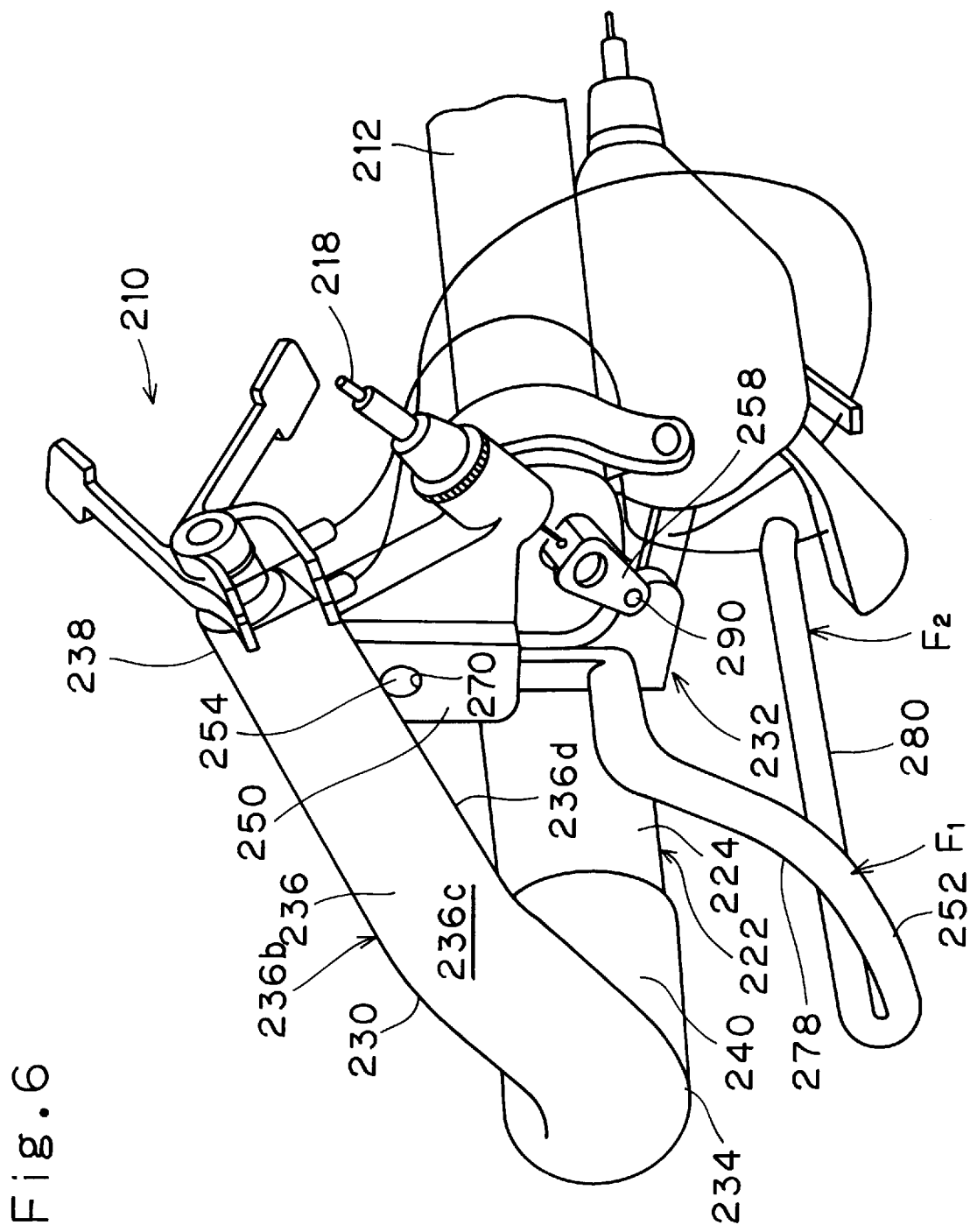
FIG. 6 is a partial perspective view of an alternative embodiment of an attachment assembly and its associated brake operating device in accordance with a third embodiment of the present invention.

Referring now to FIG. 6, an alternate attachment assembly 210 is illustrated in accordance with a third embodiment of the present invention. In this embodiment, attachment assembly 210 is substantially identical to attachment assembly 10, discussed above, except that brake lever 252 of this embodiment has been modified to be substantially L-shaped with second hand portion 280 coupled to the end of first hand portion 278. Thus, attachment assembly 210 will not be discussed or illustrated in as much detail as the first embodiment since it will be apparent to those skilled in the art that similar features of the first embodiment apply to this third embodiment.

Attachment assembly 210 includes an extension bar or bar end 230 with a brake operating device 232 coupled thereto. More specifically, extension bar 230 is adapted to be coupled to one of the free ends of handle bar 212 adjacent one of the grip portions 222, while the brake operating device 232 is coupled to the other end of extension bar 230. Extension bar 230 forms a secondary grip portion which preferably extends upwardly and outwardly from handle bar 212 and bends slightly inwardly towards the center plane of the bicycle.

Extension bar 230 has a first clamping end 234, a middle grip portion 236 and a second free end 238. First clamping end 234 has a tubular clamp 240 which receives one end of handle bar 212 adjacent one of its grip portions 222. In particular, tubular clamp 240 is a split tube with a screw for tightening clamp 240 about the end of handle bar 12. Accordingly, extension bar 230 is adjustable relative to handle bar 12 for changing the relative angular position therebetween. Preferably, clamp 240 is integrally formed at one end of middle grip portion 236.

Brake operating device 232 is preferably coupled to middle grip portion 236 adjacent second free end 238 of extension bar 230 along its inner gripping surface 236a. This allows the rider to grip the inner, upper, outer and lower gripping surfaces of middle grip portion 236 as necessary. In other words, brake operating device 232 is offset inwardly from middle grip portion 236 such that the rider can grip middle grip 236 of extension bar 230 adjacent brake operating device 232.

Brake operating device 232 basically includes a lever bracket 250 coupled to extension bar 230, a brake lever 252 pivotally coupled to lever bracket 250 by a pivot pin 254 about a pivot axis B, a spring 256 coupled between lever bracket 250 and brake lever 252, and a retaining portion or member 258 coupled to brake lever 252 for coupling one of the control wires 218 thereto.

Brake lever 252 includes a connecting portion 276, a first hand portion 278 outwardly from connecting portion 276 in a first direction and a second hand portion 280 coupled to the end of the first hand portion 278 and extending substantially perpendicular therefrom. First hand portion 278 lies on one side of a center plane of lever bracket 250, while most of second hand portion 280 lies on an the opposite side of the center plane of lever bracket 250.

First hand portion 278 is positioned generally parallel and adjacent middle grip portion 236 of extension bar 230 to permit the rider's hand to grasp first hand portion 278 from the middle grip portion 236 of extension bar 230. Second hand portion 280 is preferably positioned generally parallel and adjacent the grip portion 222 of handle bar 212 to permit the rider's hand to grasp second hand portion 280 from grip portion 222 of handle bar 212.

In order to give the rider substantially the same feel whether applying a force to first hand portion 278 or a force to second hand portion 280, the first and second hand portions 278 and 280 in their release positions have their points of force $F_1$ and $F_2$ spaced no greater than approximately 45° apart from each other as measured about the pivot point or pivot axis of pivot pin 254. The point of force $F_1$ for hand portion 278 is located approximately 1 inch from the effective free end of hand portion 278, i.e., approximately 1 inch from the connection between first and second hand portions 278 and 280. The point of force $F_2$ for hand portion 280 includes all of the operative surface of hand portion 280 which is generally parallel to grip portion 222 and within the rider's grasp. In the preferred embodiment, the angle Ø formed between the points of force $F_1$ and $F_2$ is approximately 4° apart as measured about pivot axis of pivot pin 254. The preferred range for angle Ø is 0°–36°.

Middle grip portion 236 and hand portions 278 and 280 are configured such that the grip dimension between first hand portion 278 and middle grip portion 236 is substantially similar to the grip dimension between second hand portion 280 and grip portion 222 of handle bar 212. Of course, the amount of travel of hand portions 278 and 280 are also substantially identical in view of the above discussed relationship.

Fourth Embodiment

Figure 7:
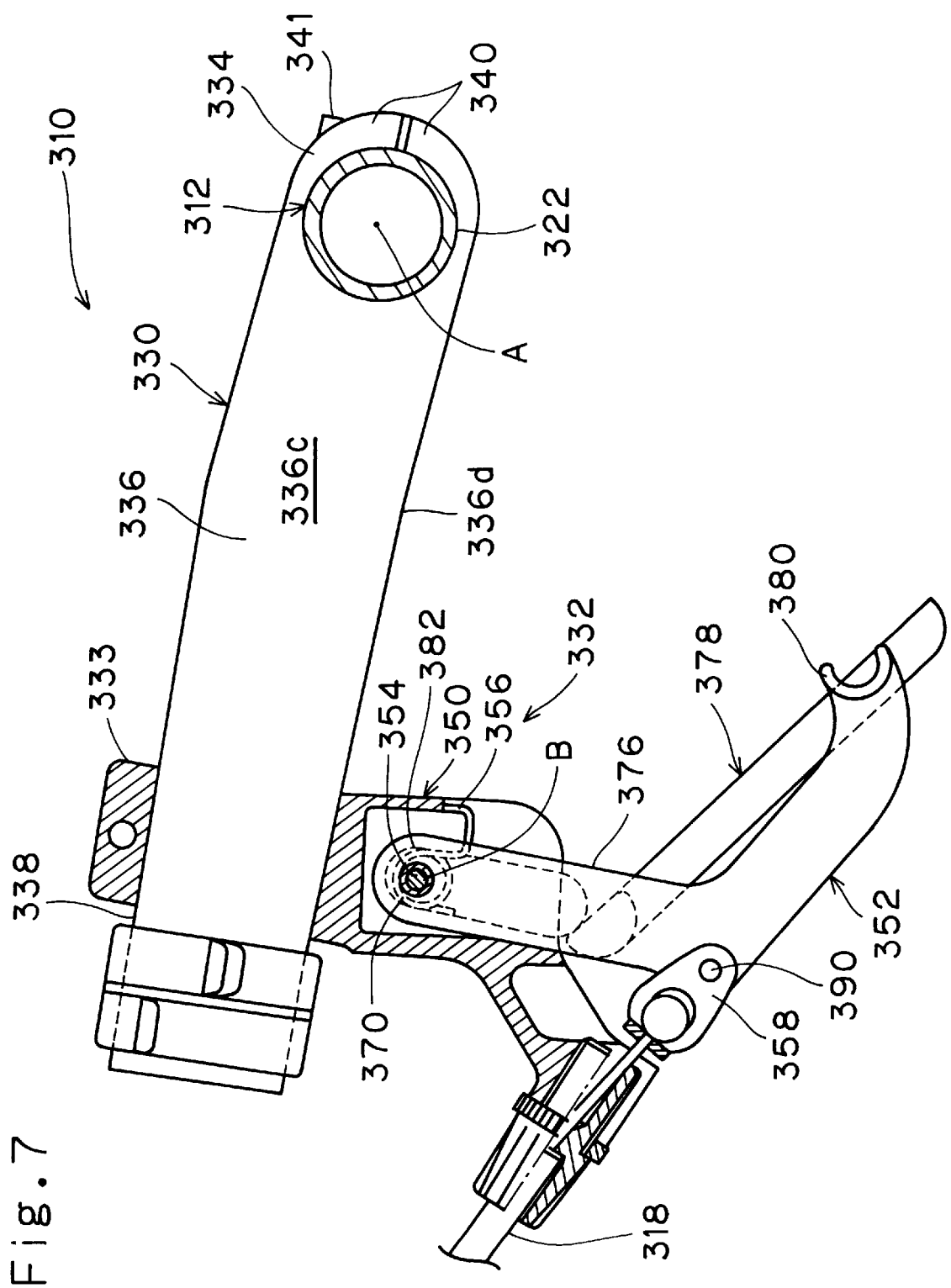
FIG. 7 is a partial side elevational view of another alternative embodiment of a brake operating device in accordance with a fourth embodiment of the present invention in which the brake operating device is an attachment removably coupled to the extension bar or bar end.

Referring now to FIG. 7, a further alternative attachment assembly 310 in accordance with a fourth embodiment of the present invention is illustrated. This fourth embodiment of the present invention is substantially similar to the first embodiment of the present invention, discussed above, except that extension bar 330 and brake operating device 332 can be separated from each other in this fourth embodiment such that the brake operating device 332 can be completely removed from extension bar 330 as well as adjusted along the length of extension bar 330. In view of the similarities between the first and fourth embodiments of the present invention, attachment assembly 310 of the fourth embodiment of the present invention will not be discussed or illustrated in detail herein. Rather, it will be apparent to those skilled in the art that many of the discussions and illustrations of the first embodiment also applies to this fourth embodiment.

Attachment assembly 310 includes an extension bar or bar end 330 with a brake operating device 332 releasably coupled thereto by clamp 333. More specifically, extension bar 330 is adapted to be coupled to one of the free ends of handle bar 312 adjacent one of the grip portions 322, while the brake operating device 332 is releasably coupled to the other end of extension bar 330. Extension bar 330 forms a secondary grip portion which preferably extends upwardly and outwardly from handle bar 12 and bends slightly inwardly towards the center plane of the bicycle.

Extension bar 330 has a first clamping end 334, a middle grip portion 336 and a second free end 338. First clamping end 334 has a tubular clamp 340 which receives one end of handle bar 12 adjacent one of its grip portions 32. In particular, tubular clamp 340 is a split tube with a screw 341 for tightening clamp 340 about the end of handle bar 312. Accordingly, extension bar 330 is adjustable relative to handle bar 312 for changing the relative angular position therebetween. Preferably, clamp 340 is integrally formed at one end of middle grip portion 336.

Brake operating device 332 is preferably releasably coupled to middle grip portion 336 adjacent second free end 338 of extension bar 330 along its inner gripping surface 336a. This allows the rider to grip the inner, upper, outer and lower gripping surfaces of middle grip portion 336 as necessary. In other words, brake operating device 332 is offset inwardly from middle grip portion 336 such that the rider can grip middle grip portion 336 of extension bar 330 adjacent brake operating device 332.

Brake operating device 332 basically includes a lever bracket 350 releasably coupled to extension bar 330, a brake lever 352 pivotally coupled to lever bracket 350 by a pivot pin 354 about a pivot axis B, a spring 356 coupled between lever bracket 350 and brake lever 352, and a retaining portion or member 358 coupled to brake lever 352 for coupling one of the control wires 318 thereto. In this embodiment, brake lever 352 is substantially identical to brake lever 52, discussed above. Thus, brake lever 352 will not be discussed or illustrated in as much detail as the first embodiment.

While four preferred embodiments of the present invention have been described and illustrated, it will become apparent to those skilled in the art once given this disclosure that various modifications, changes, improvements and other variations may be made without departing from the spirit or scope of this invention as defined by the following claims.

What is claimed is:

1. A brake operating device for use with a handle bar having a first grip portion extending in a first direction and a second grip portion extending in a second direction which forms an angle with the first direction, comprising:
   a lever bracket for attachment to the handle bar and to a portion of a control wire; and
   a brake lever pivotally coupled to said lever bracket between a release position and a brake position, said brake lever including
      a retaining portion forming a connection point for coupling one end of the control wire thereto,
      a first hand portion swingably mounted about a pivot axis and positioned adjacent the first grip portion of the handle bar to permit the rider's hand to grasp said first band portion from the first grip portion of the handle bar, and
      a second hand portion swingably mounted about a pivot axis and positioned adjacent the second grip portion of the handle bar to permit the rider's hand to grasp said second hand portion from the second grip portion of the handle bar, said first and second hand portions of said brake lever having force application points which are spaced approximately 45° or less apart from each other as measured about their respective said pivot axes in said release position of said brake lever.

2. A brake operating device according to claim 1, wherein said pivot axes of said first and second hand portions are coaxial, and form an acute angle with a central longitudinal axis of the second grip portion of the handle bar.

3. A brake operating device according to claim 1, further comprising
   a spring coupled between said brake lever and said lever bracket for biasing said brake lever to a release position.

4. A brake operating device according to claim 1, wherein said first and second hand portions are fixedly coupled together for simultaneous movement.

5. A brake operating device according to claim 1, wherein said pivot axes being coaxial and said lever bracket has a pair of opposed side walls with a pivot pin extending therebetween and forming said pivot axes for pivotally receiving said brake lever thereon.

6. A brake operating device according to claim 1, wherein said lever bracket includes a clamp for releasably coupling said lever bracket to one end of the handle bar.

7. A brake operating device according to claim 1, wherein said lever bracket is integrally formed with said first grip portion of said handlebar as a one-piece, unitary part.

8. A brake operating device according to claim 1, wherein each of said first and second hand portions has a free end.

9. A brake operating device according to claim 8, wherein said brake lever includes a connecting portion with a first end pivotally coupled to said lever bracket via a pivot pin and a second end coupled to each of said first and second hand portions.

10. A brake operating device according to claim 9, wherein
   said brake lever further includes a first arm portion interconnecting said first hand portion to said second end of said connecting portion and a second arm portion interconnecting said second hand portion to said second end of said connecting portion, said first hand portion being positioned on one side of said connecting portion and said second hand portion being positioned on the other side of said connecting portion.

11. A brake operating device according to claim 1, wherein
   said first hand portion lies on one side of said lever bracket and said second hand portion lies on the other side of said lever bracket.

12. A brake operating device according to claim 1, wherein
   said force application points of said first and second hand portions of said brake lever are located within a range of 0°–36° apart from each other as measured about their respective said pivot axes in said release position of said brake lever.

13. A brake operating device according to claim 1, wherein
   said force application points of said first and second hand portions of said brake lever are located within a range of 0°–8° apart from each other as measured about their respective said pivot axes in said release position of said brake lever.

14. A brake operating device according to claim 1, wherein
   said first hand portion has a first end pivotally coupled to said first grip portion and a second end coupled to said second hand portion.

15. A brake operating device according to claim 14, wherein
   said second hand portion extends substantially perpendicular to said first hand portion.

16. An attachment assembly for attachment to one end of a handle bar, comprising:
   a bar end having a first end with a clamp for coupling to the one end of the handle bar, a middle grip portion configured and sized without obstructions for receiving a rider's hand, and a second end positioned remotely from the handle bar; and
   a brake operating device fixedly coupled to said bar end, said brake operating device including
      a retaining portion forming a connection point for coupling one end of a control wire thereto,
      a first hand portion swingably mounted about a pivot point from a release position to a brake position and positioned adjacent said middle grip portion of said bar end to permit the rider's hand to grasp said first hand portion from said middle grip portion of said bar end, and
      a second hand portion swingably mounted about a pivot point from a release position to a brake position and positioned adjacent the handle bar coupled to said first end of said bar end to permit the rider's hand to grasp said second hand portion from the handle bar.

17. An attachment assembly according to claim 16, wherein said pivot points of said first and second hand portions are coaxially arranged about a first pivot axis.

18. An attachment assembly according to claim 17, wherein said first and second hand portions have force application points which are spaced less than approximately 45° apart from each other as measured about said pivot axis in said release positions.

19. An attachment assembly according to claim 17, wherein said first and second hand portions of said brake lever have force application points which are located within a range of 0°–36° apart from each other as measured about said pivot point in said release positions.

20. An attachment assembly according to claim 17, wherein said pivot axis of said first and second hand portions forms an acute angle with a central longitudinal axis of the handle bar.

21. An attachment assembly according to claim 17, wherein said first and second hand portions are fixedly coupled together for simultaneous movement.

22. An attachment assembly according to claim 16, wherein said brake operating device includes a lever bracket integrally formed with said bar end as a one-piece, unitary part and said first and second hand portions being pivotally coupled to said lever bracket.

23. An attachment assembly according to claim 16, wherein said brake operating device includes a lever bracket with a clamp for coupling said first and second hand portions to said bar end.

24. An attachment assembly according to claim 16, wherein each of said first and second hand portions has a free end.

25. An attachment assembly according to claim 16, wherein said first hand portion has a first end pivotally coupled to said bar end and a second end coupled to said second hand portion.

26. An attachment assembly according to claim 25, wherein said second hand portion extends substantially perpendicular to said first hand portion.

27. An attachment assembly according to claim 16, wherein said bar end has an upper gripping surface, a lower gripping surface, an outer gripping surface and an inner gripping surface, said inner gripping surface faces generally toward the handle bar attached to said clamp, said brake operating device extends outwardly from said inner gripping surface so that the rider's hand can grasp said upper, lower and outer gripping surfaces of said bar end adjacent said brake operating device.

28. A brake operating device for use with a handle bar having a first grip portion and a second grip portion, comprising:

a lever bracket for attachment to the handle bar and to a portion of a control wire, said lever bracket having a pivot point with a pivot axis arranged substantially traverse to a center longitudinal plane of said lever bracket; and a brake lever pivotally coupled to said lever bracket about said pivot point between a release position and a brake position, said brake lever including a retaining portion forming a connection point for coupling one end of the control wire thereto, a first hand portion swingably mounted about said pivot point and extending outwardly in a first direction relative to said brake lever to be offset to one side of said center longitudinal plane of said lever bracket such that said first hand portion is located adjacent the first grip portion of the handle bar to permit the rider's hand to grasp said first hand portion from the first grip portion of the handlebar, and a second hand portion swingably mounted about said pivot point and extending outwardly in a second direction relative to said brake lever to be offset to an opposed side of said center longitudinal plane from said first hand portion such that said second hand portion is positioned adjacent the second grip portion of the handle bar to permit the rider's hand to gasp said second hand portion from the second grip portion of the handle bar.

29. A brake operating device according to claim 28, further comprising a spring coupled between said brake lever and said lever bracket for biasing said brake lever to a release position.

30. A brake operating device according to claim 28, wherein said first and second hand portions are fixedly coupled together for simultaneous movement.

31. A brake operating device according to claim 28, wherein said lever bracket has a pair of opposed side walls with a pivot pin extending therebetween for pivotally receiving said brake lever thereon.

32. A brake operating device according to claim 28, wherein said lever bracket includes a clamp for releasably coupling said lever bracket to one end of the handle bar.

33. A brake operating device according to claim 28, wherein said first and second hand portions of said brake lever have force application points which are spaced less than approximately 45° apart from each other as measured about said pivot point in said release position of said brake lever.

34. A brake operating device according to claim 28, wherein said first and second hand portions of said brake lever have force application points which are located within a range of 0°–36° apart from each other as measured about said pivot point in said release position of said brake lever.

35. A brake operating device according to claim 28, wherein said first and second hand portions of said brake lever have force application points which are located within a range of 0°–8° apart from each other as measured about said pivot point in said release position of said brake lever.

36. A brake operating device according to claim 28, wherein said brake lever has a connecting portion with a first end pivotally coupled to said lever bracket via a pivot and a second end coupled to said first and second arm portions of said first and second hand portions, respectively.

37. A brake operating device according to claim 36, wherein said connecting portion includes first and second connecting sections with said first arm portion being coupled to said first connecting section and said second arm portion being coupled to said second connecting section.

38. A handle bar assembly for attachment to a vehicle, comprising:

a cross bar having a center portion, a first end with a first grip portion located on one side of said center portion, and a second end with a second grip portion located on the other side of said center portion;

a first bar end having a first end coupled to said first end of said cross bar so as to extend generally perpendicular to said cross bar, a middle grip portion for receiving a rider's hand, and a second end positioned remotely from said cross bar; and a first brake operating device fixedly coupled to said first bar end, said first brake operating device including a first retaining portion forming a first connection point for coupling one end of a first control wire thereto, a first hand portion swingably mounted about a pivot point from a release position to a brake position and positioned adjacent said middle grip portion of said first bar end to permit the rider's hand to grasp said first hand portion from said middle grip portion of said first bar end, and a second hand portion swingably mounted about a pivot point from a release position to a brake position and positioned adjacent said first grip portion of said cross bar to permit the rider's hand to grasp said second hand portion from said first grip portion of said cross bar.

39. A handle bar assembly according to claim 38, further comprising:

a second bar end having a first end coupled to said second end of said cross bar so as to extend generally perpendicular to said cross bar, a middle grip portion for receiving a rider's hand, and a second end positioned remotely from said cross bar; and a second brake operating device fixedly coupled to said second bar end, said second brake operating device including a second retaining portion forming a second connection point for coupling one end of a second control wire thereto, a third hand portion swingably mounted about a pivot point from a release position to a brake position and positioned adjacent said middle grip portion of said second bar end to permit the rider's hand to grasp said third hand portion from said middle grip portion of said second bar end, and a fourth hand portion swingably mounted about a pivot point from a release position to a brake position and positioned adjacent said second grip portion of said cross bar to permit the rider's hand to grasp said fourth hand portion from said second grip portion of said cross bar.

40. A handle bar assembly according to claim 39, wherein said pivot points of said first and second hand portions are coaxially arranged about a first pivot axis, and said pivot points of said third and fourth hand portions are coaxially arranged about a second pivot axis.

41. A handle bar assembly according to claim 40, wherein said first and second hand portions have force application points which are spaced less than approximately 45° apart from each other as measured about said first pivot axis in their respective said release positions, and said third and fourth hand portions have force application points which are spaced less than approximately 45° apart from each other as measured about said second pivot axis in their respective said release positions.

42. A handle bar assembly according to claim 40, further comprising at least one shift lever mounted on said first bar end and at least one shift lever mounted on said second bar end.

43. A handle bar assembly according to claim 39, wherein said first bar end includes a first clamp for releasably coupling said first bar end to said first end of said cross bar, and said second bar end includes a second clamp for releasably coupling said second bar end to said second end of said cross bar.

44. A handle bar assembly according to claim 39, wherein said first bar end has an upper gripping surface, a lower gripping surface, an outer gripping surface and an inner gripping surface, said inner gripping surface faces generally toward said center portion of said cross bar, said first brake operating device extends outwardly from said inner gripping surface so that the rider's hand can grasp said upper, lower and outer gripping surfaces of said first bar end adjacent said first brake operating device, and said second bar end has an upper gripping surface, a lower gripping surface, an outer gripping surface and an inner gripping surface, said inner gripping surface faces generally toward said center portion of said cross bar, said second brake operating device extends outwardly from said inner gripping surface of said second bar end so that the rider's hand can grasp said upper, lower and outer gripping surfaces of said second bar end adjacent said second brake operating device.

45. A handle bar assembly according to claim 39, wherein said first brake operating device includes a first lever bracket for pivotally coupling said first and second hand portions to said first bar end, said first hand portion is positioned on a first side of said first lever bracket and said second hand portion is positioned on a second side of said first lever bracket, and said second brake operating device includes a second lever bracket for pivotally coupling said third and fourth hand portions to said second bar end, said third hand portion is positioned on a first side of said second lever bracket and said fourth hand portion is positioned on a second side of said second lever bracket.

* * * * *